United States Patent
Wang et al.

(10) Patent No.: US 10,156,881 B2
(45) Date of Patent: Dec. 18, 2018

(54) ELECTRONIC DEVICE AND METHOD FOR CONTROLLING USER EXPERIENCE WITH APPLICATION ON ELECTRONIC DEVICE

(71) Applicant: MEDIATEK INC., Hsin-Chu (TW)

(72) Inventors: Wei-Ting Wang, Taipei (TW); Yingshiuan Pan, Kaohsiung (TW); Lu-Chia Tseng, Hsinchu (TW); Yu-Chia Chang, New Taipei (TW)

(73) Assignee: MEDIATEK INC., Hsin-Chu (TW)

( * ) Notice: Subject to any disclaimer, the term of this patent is extended or adjusted under 35 U.S.C. 154(b) by 179 days.

(21) Appl. No.: 15/356,673

(22) Filed: Nov. 21, 2016

(65) Prior Publication Data

US 2017/0371390 A1    Dec. 28, 2017

Related U.S. Application Data

(60) Provisional application No. 62/354,137, filed on Jun. 24, 2016.

(51) Int. Cl.
*G06F 1/32* (2006.01)
*G06F 1/28* (2006.01)
*G06F 1/20* (2006.01)

(52) U.S. Cl.
CPC .............. *G06F 1/28* (2013.01); *G06F 1/206* (2013.01); *G06F 1/3206* (2013.01); *G06F 1/329* (2013.01); *G06F 1/3212* (2013.01)

(58) Field of Classification Search
CPC .............. G06F 1/32; G06F 1/28; G06F 1/00

USPC .................................................. 713/300–375
See application file for complete search history.

(56) References Cited

U.S. PATENT DOCUMENTS

| | | | |
|---|---|---|---|
| 8,756,522 B2 | 6/2014 | Lee | |
| 2005/0166075 A1* | 7/2005 | Hack | G06F 1/206 713/320 |
| 2013/0227261 A1* | 8/2013 | Anderson | G06F 9/4401 713/2 |
| 2015/0067377 A1* | 3/2015 | Park | G06F 1/3212 713/340 |
| 2016/0062439 A1* | 3/2016 | Lu | G06F 1/3228 713/320 |

FOREIGN PATENT DOCUMENTS

TW    201527963 A    7/2015

\* cited by examiner

*Primary Examiner* — Jaweed A Abbaszadeh
*Assistant Examiner* — Keshab R Pandey
(74) *Attorney, Agent, or Firm* — Winston Hsu

(57) ABSTRACT

A method for controlling a user experience with an application on an electronic device is provided. The method includes the following steps: detecting a temperature of the electronic device; detecting a power of the electronic device; calculating a power-thermal hint according to the detected temperature and the detected power; and adjusting a complexity level of the application according to at least the power-thermal hint so as to control the user experience with the application.

18 Claims, 12 Drawing Sheets

| $T_J(T_G=80°C)$ | 84°C | 82°C | 80°C | 78°C | 76°C | 74°C |
|---|---|---|---|---|---|---|
| $H_{PT}$ | -2 | -1 | 0 | 1 | 2 | 3 |
| $T_J(T_G=75°C)$ | 85°C | 80°C | 75°C | 70°C | 65°C | 60°C |

FIG. 7

|  | $H_{PT} < TH_{NL}$ | $TH_{NL} \leqq KPI \leqq TH_{NH}$ | $H_{PT} > TH_{NH}$ |
|---|---|---|---|
| $KPI > TH_{KH}$ | Decrease complexity level and system capacity | Decrease system capacity | Decrease system capacity, and/or increase complexity level |
| $TH_{KL} \leqq KPI \leqq TH_{KH}$ | | NOP | NOP |
| $KPI < TH_{KL}$ | | Decrease complexity level | Decrease complexity level, and/or increase system capacity |

FIG. 12

ELECTRONIC DEVICE AND METHOD FOR CONTROLLING USER EXPERIENCE WITH APPLICATION ON ELECTRONIC DEVICE

CROSS REFERENCE TO RELATED APPLICATIONS

This application claims the benefit of U.S. provisional application No. 62/354,137, filed on Jun. 24, 2016, the contents of which are incorporated herein by reference.

BACKGROUND

The disclosed embodiments of the present invention relate to user experience adjustment, and more particularly, to a method for controlling a user experience with an application on an electronic device according to a power-thermal hint, and related electronic device.

Nowadays a portable apparatus utilizes a high performance mobile system-on-chip (SoC) to support applications requiring a high computation power. This results in great power consumption of the mobile SoC and a rapid rise in the temperature of the portable apparatus. In order to prevent overheating of the portable apparatus, the portable apparatus enters a thermal throttling mode to reduce an operating frequency of a processor when the temperature of the portable apparatus reaches a temperature threshold. However, decreasing the operating frequency degrades a user experience with an application running on the portable apparatus. For example, some video frames are lost due to thermal throttling.

To avoid the decrease in computational power of a processor, a conventional portable apparatus employs a fixed number of processors, each of which operates at a fixed frequency. However, processing simple image frames using such portable apparatus results in power waste, while processing complicated image frames using the same results in frame loss.

Thus, there is a need for a novel user experience control mechanism to provide a good user experience without triggering thermal throttling.

SUMMARY

In accordance with exemplary embodiments of the present invention, a method for controlling a user experience with an application on an electronic device according to a power-thermal hint, and related electronic device are proposed to solve the above-mentioned problems.

According to an embodiment of the present invention, an exemplary method for controlling a user experience with an application on an electronic device is disclosed. The exemplary method comprises the following step: detecting a temperature of the electronic device; detecting a power of the electronic device; calculating a power-thermal hint according to the detected temperature and the detected power; and adjusting a complexity level of the application according to at least the power-thermal hint so as to control the user experience with the application.

According to an embodiment of the present invention, an exemplary electronic device is disclosed. The exemplary electronic device comprises a thermal monitor, a power monitor and a controller. The thermal monitor is arranged for detecting a temperature of the electronic device. The power monitor is arranged for detecting a power of the electronic device. The controller is coupled to the thermal monitor and the power monitor, and is arranged for calculating a power-thermal hint according to the detected temperature and the detected power, and adjusting a complexity level of the application according to at least the power-thermal hint so as to control a user experience with an application on the electronic device.

The proposed user experience control mechanism may calculate a power-thermal hint, which is a single indicator (or an index) indicating power and thermal conditions of an electronic device, to create an easy-to-use abstraction layer for an application running on the electronic device, wherein the application may only need to know the power-thermal hint to adjust a complexity level thereof. Additionally, the proposed user experience control mechanism may provide a warning indicator to the application in advance before thermal throttling is triggered. The proposed user experience control mechanism may not only maintain an acceptable/good user experience but also reduce power consumption to prolong battery life.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 7 illustrates exemplary correspondences between the detected temperature and the hint level of the power-thermal hint shown in FIG. 3 under different scenarios according to an embodiment of the present invention.

FIG. 12 illustrates an exemplary user experience control strategy according to an embodiment of the present invention.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "coupled" is intended to mean either an indirect or direct electrical connection. Accordingly, if one device is electrically connected to another device, that connection may be through a direct electrical connection, or through an indirect electrical connection via other devices and connections.

The proposed user experience control mechanism may eliminate/reduce power wastes of the electronic device while maintaining stable operation and providing a good user experience. For example, since a user experience with an application running on the electronic device may degrade due to thermal throttling, which is triggered when a temperature of the electronic device increases to a temperature threshold, the proposed user experience control mechanism may monitor temperature information of the electronic device to avoid triggering of thermal throttling. In addition, although a low battery voltage may reduce power consumption of the electronic device, a system shutdown is very likely to occur (i.e. low battery shutdown). Hence, the proposed user experience control mechanism may further monitor power information of the electronic device (e.g. a battery voltage thereof) to avoid an unwanted shutdown.

In order to effectively control the temperature and power consumption of an electronic device to ensure a good user experience and maintain stable operation of the electronic device, the proposed user experience control mechanism may generate a power-thermal hint (or an indicator) according to thermal information and power information of the electronic device, thereby adaptively adjusting a complexity level of an application (e.g. a computational complexity associated with the application) and/or a system capacity (e.g. a processor frequency and the number of activated processors) according to the power-thermal hint without triggering thermal throttling or low battery shutdown. In other words, the proposed user experience control mechanism may adjust a request capacity (the complexity level of the application) and/or an affordable capacity (the system capacity) according to the power-thermal hint so as to not only avoid overheating and save power, but also ensure a good user experience.

Figure 1:
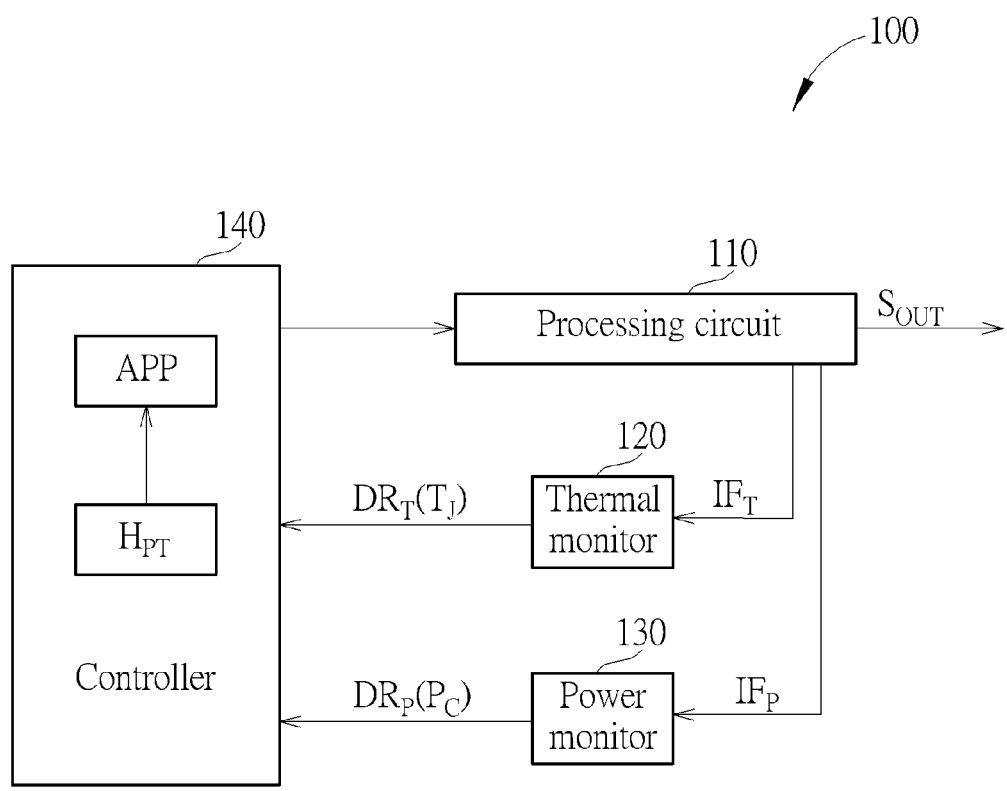
FIG. 1 is a block diagram illustrating an exemplary electronic device according to an embodiment of the present invention.

Please refer to FIG. 1, which is a block diagram illustrating an exemplary electronic device according to an embodiment of the present invention. The electronic device 100 may include, but is not limited to, a processing circuit 110, a thermal monitor 120, a power monitor 130 and a controller 140, wherein the controller 140 may include an application APP running on the electronic device 100. By way of example but not limitation, the electronic device 100 may be implemented by a mobile phone, and the application APP may be a coding/decoding (codec) application (e.g. an image/video playback/recording application), a game application or a user interface (UI) effect application (e.g. an application for displaying a UI animation on a screen in response to a gesture). In addition, the controller 140 may provide system settings required by the application APP for the processing circuit 110. The processing circuit 110 may perform operations associated with the application APP, and generate an output signal $S_{OUT}$ accordingly. For example, in a case where the application APP is a codec application, the processing circuit 110 may output a video signal as the output signal $S_{OUT}$ for viewing.

The thermal monitor 120 may detect a temperature $T_J$ of the electronic device 100, and the power monitor 130 may detect a power $P_C$ of the electronic device 100, wherein the power $P_C$ may be a power supplied within the electronic device 100, such as a battery voltage, or a power consumed within the electronic device 100. For example, the thermal monitor 120 may detect heat information $IF_T$ (obtained from the electronic device 100 or the processing circuit 110) to generate a heat detection result $DR_T$, wherein the heat detection result $DR_T$ may indicate the detected temperature $T_J$. The power monitor 130 may detect power information $IF_P$ (obtained from the electronic device 100 or the processing circuit 110) a power detection result $DR_P$, wherein the power detection result $DR_P$ may indicate the detected power $P_C$ (e.g. a detected battery voltage). Next, the controller 140 may calculate the heat detection result $DR_T$ (e.g. the detected temperature $T_J$) and the power detection result $DR_P$ (e.g. the detected power $P_C$) to generate a power-thermal hint $H_{PT}$ (e.g. an indicator indicating a power and thermal condition of the electronic device 100), and adjust a complexity level of the application APP and/or a system capacity according to at least the power-thermal hint $H_{PT}$. In response to an adjustment of the complexity level of the application APP and/or an adjustment of the system capacity, the processing circuit 110 may adjust the output signal $S_{OUT}$ to control a user experience with the application APP.

When the complexity level of the application APP increases, a corresponding request capacity increases and the electronic device 100 is expected to provide a better user experience. Hence, when the controller 140 increase the complexity level of the application APP according to the power-thermal hint $H_{PT}$, the electronic device 100 may provide a better user experience; when the controller 140 decrease the complexity level of the application APP according to the power-thermal hint $H_{PT}$, the electronic device 100 may reduce the system temperature and power consumption by providing an acceptable user experience.

Please note that, in a case where the application APP is implemented by a video codec application, the complexity level of the application APP may include, but is not limited to, a video quality, a video resolution, a video bitrate and/or a vide frame rate. For example, the controller 140 may increase the complexity level of the application APP by enabling a deblocking filter. In another case where the application APP is implemented by an image codec application, the complexity level of the application APP may include, but is not limited to, an image resolution and/or an image quality (e.g. contrast, sharpness, and/or color saturation).

In yet another case where the application APP is implemented by a three-dimensional (3D) game application, a complexity level adjustment may be associated with, but is not limited to, enabling/disabling a texture filter, resolution adjustment, enabling/disabling anti-aliasing, and enabling/disabling other effects such as a motion blur and a high dynamic range (HDR) effect. In still another case where the application APP is implemented by a UI effect application (e.g. an Android launcher), a complexity level adjustment may be associated with, but is not limited to, complexity of a UI animation such as a fade-in effect, a fade-out effect, a sliding effect or a flipping effect. For example, the controller 140 may decrease the complexity level of the application APP by disabling at least one of the fade-in, fade-out, sliding and flipping effects to thereby mitigate the temperature rise and/or reduce power consumption.

Additionally, when the system capacity increases, a corresponding affordable capacity increases and the electronic device 100 is expected to provide a better user experience. Hence, when the controller 140 increase the system capacity of the application APP according to the power-thermal hint $H_{PT}$, the electronic device 100 may provide a better user experience; when the controller 140 decrease the system capacity of the application APP according to the power-thermal hint $H_{PT}$, the electronic device 100 may reduce the system temperature and power consumption by providing an acceptable user experience. Please note that, the system capacity may include, but is not limited to, a processor frequency and/or the number of activated processors, wherein one of the activated processors may be a central processing unit (CPU) or a graphics processing unit (GPU).

Figure 2:
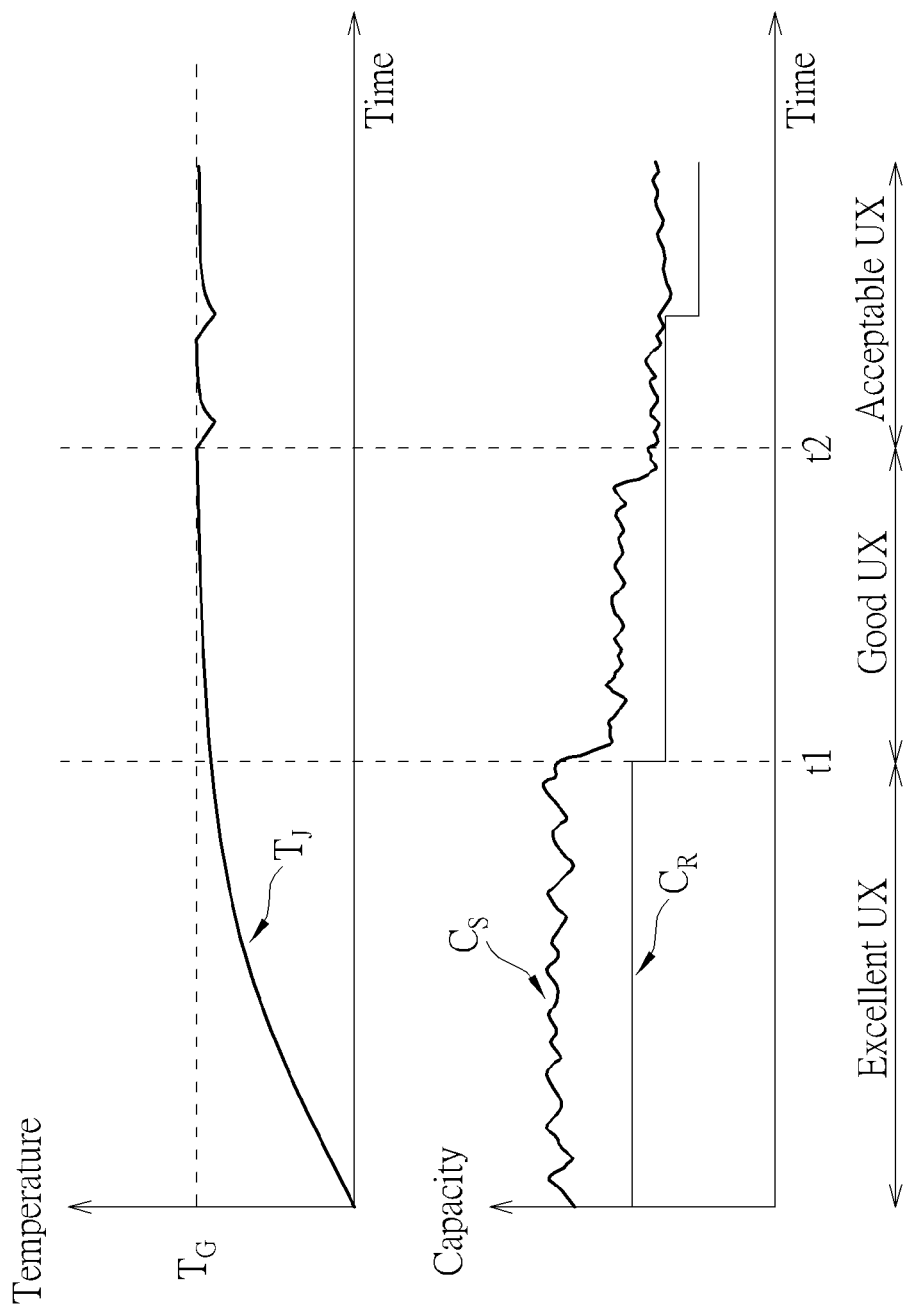
FIG. 2 illustrates exemplary adjustments of a user experience of the electronic device 100 according to an embodiment of the present invention.

Please refer to FIG. 2 in conjunction with FIG. 1. FIG. 2 illustrates exemplary adjustments of a user experience of the electronic device 100 according to an embodiment of the present invention. Before a point in time t1, the electronic device 100 may provide an excellent user experience (UX) with the application APP. When the power-thermal hint $H_{PT}$ indicates that a system workload is too high at the point in time t1 (the detected temperature $T_J$ will likely exceed a target temperature $T_G$), the controller 140 may reduce a request capacity $C_R$ (corresponding to the complexity level of the application APP) so as to decrease a rising speed of the detected temperature $T_J$. As the request capacity $C_R$ is reduced, the controller 140 may further reduce an affordable capacity $C_S$ (corresponding to the system capacity) to reduce power consumption. As the affordable capacity $C_S$ is still greater than the request capacity $C_R$, the electronic device 100 may provide a good UX after the point in time t1. Further, when the power-thermal hint $H_{PT}$ indicates that the affordable capacity $C_S$ can be reduced at a point in time t2 (the detected temperature $T_J$ reaches the target temperature $T_G$), the controller 140 may reduce the affordable capacity $C_S$ again to decrease the detected temperature $T_J$. As the affordable capacity $C_S$ is still greater than the request capacity $C_R$, the electronic device 100 may provide an acceptable UX after the point in time t2.

In view of this, the electronic device 100 may maintain an acceptable level of the user experience with the application APP by referring to the power-thermal hint $H_{PT}$ to adjust the complexity level of the application APP and/or the system capacity. It should be noted that the proposed user experience control mechanism may adjust the complexity level and/or the system capacity before thermal throttling is triggered. For example, the power-thermal hint $H_{PT}$ may indicate a difference between the detected temperature $T_J$ and the target temperature $T_G$. As the electronic device 100 enters a thermal throttling mode when the detected temperature $T_J$ equals or exceeds a temperature threshold, the target temperature $T_G$ may be set to be less than the temperature threshold such that the controller 140 may determine a current thermal/power condition according to the power-thermal hint $H_{PT}$ before the electronic device 100 enters the thermal throttling mode. Hence, the electronic device 100 may adaptively adjust the complexity level and/or the system capacity thermal throttling is triggered.

The controller 140 may determine adjustments of the request capacity $C_R$ and/or the affordable capacity $C_S$ according to a hint level of the power-thermal hint $H_{PT}$. For example, in one embodiment, the hint level of the power-thermal hint $H_{PT}$ increases as the detected temperature $T_J$ decreases, and decreases as the detected temperature $T_J$ increases; the hint level of the power-thermal hint $H_{PT}$ increases as the detected power $P_C$ increases, and decreases as the detected power $P_C$ decreases. In other words, the higher hint level the power-thermal hint $H_{PT}$ has, the safer power/thermal condition the electronic device 100 is in.

When the hint level of the power-thermal hint $H_{PT}$ is less than a first hint threshold, meaning that the detected temperature $T_J$ is too high and/or the detected power $P_C$ is too low, the controller 140 may decrease the complexity level of the application APP to reduce the system workload, and/or increase the system capacity to enhance the computational power. Hence, the electronic device 100 may achieve the temperature adjustment while maintain an acceptable user experience.

When the hint level of the power-thermal hint $H_{PT}$ is greater than a second hint threshold, meaning that the detected temperature $T_J$ is low enough and/or the detected power $P_C$ is high enough, the controller 140 may increase the complexity level of the application APP to take advantage of the sufficient computational power to thereby enhance the user experience, and/or the controller 140 may decrease the system capacity to reduce power consumption while maintaining a good user experience.

The aforementioned second hint threshold may be greater than or equal to the first hint threshold. In a case where the second hint threshold is greater than the first hint threshold, when the hint level of the power-thermal hint $H_{PT}$ is between the first hint threshold and the second hint threshold, the controller 140 may control the user experience with the application APP according to the power-thermal hint $H_{PT}$. By way of example but not limitation, the controller 140 may reduce one of the complexity level of the application APP and the system capacity. However, it is possible not to adjust the complexity level of the application APP and the system capacity when the hint level of the power-thermal hint $H_{PT}$ is between the first hint threshold and the second hint threshold.

Further, as a high rate of temperature change represents a high rising speed of the temperature, the controller 140 may calculate the power-thermal hint $H_{PT}$ according to a rate of change of the detected temperature $T_J$. In other words, the rate of temperature change may help determine adjustments of the complexity level of the application APP and/or the system capacity. For example, as thermal throttling is more likely to be triggered when the temperature $T_J$ has a high rising speed, the power-thermal hint $H_{PT}$ corresponding to a high rate of temperature change may have a hint level smaller than that of the power-thermal hint $H_{PT}$ corresponding to a low rate of temperature change at the same temperature $T_J$. Hence, more reduction of the complexity level may be needed when the temperature $T_J$ has a higher rate of change. In brief, the hint level of the power-thermal hint $H_{PT}$ is a first level when the detected temperature $T_J$ has a first rate of change, and the hint level of the power-thermal hint $H_{PT}$ is a second level greater than the first level when the detected temperature $T_J$ has a second rate of change less than the first rate of change.

Similarly, the controller 140 may calculate the power-thermal hint $H_{PT}$ according to a rate of change of the detected power $P_C$, wherein a rate of power change may help determine adjustments of the complexity level of the application APP and/or the system capacity. For example, as the electronic device 100 cannot maintain normal operations when the detected power $P_C$ (e.g. a power supplied to the electronic device 100) is insufficient, the power-thermal hint $H_{PT}$ corresponding to a high rate of power change may have a hint level greater than that of the power-thermal hint $H_{PT}$ corresponding to a low rate of temperature change at the same power $P_C$. Hence, more reduction of the complexity level may be needed when the power $P_C$ has a smaller rate of change. In brief, the hint level of the power-thermal hint $H_{PT}$ is a first level when the detected power $P_C$ has a first rate of change, and the hint level of the power-thermal hint $H_{PT}$ is a second level greater than the first level when the detected power $P_C$ has a second rate of change greater than the first rate of change Please note that the aforementioned relationship between the hint level of the power-thermal hint $H_{PT}$ and the detected temperature $T_J$, and/or the aforementioned relationship between the hint level of the power-thermal hint $H_{PT}$ and the detected power $P_C$ is for illustrative purposes only, and is not meant to be a limitation of the present invention. The change in the hint level of the power-thermal hint $H_{PT}$ in response to the detected temperature $T_J$ (and/or the detected power $P_C$) may depend on the method used for calculating the power-thermal hint $H_{PT}$. Additionally, control operations corresponding to the change in the hint level of the power-thermal hint $H_{PT}$ may depend on actual design requirements.

In view of the above, the proposed user experience control mechanism may adjust the request capacity (the complexity level of the application) and/or the affordable capacity (the system capacity) according to the power-thermal hint to thereby maintain a good user experience. Further description is provided below.

Figure 3:
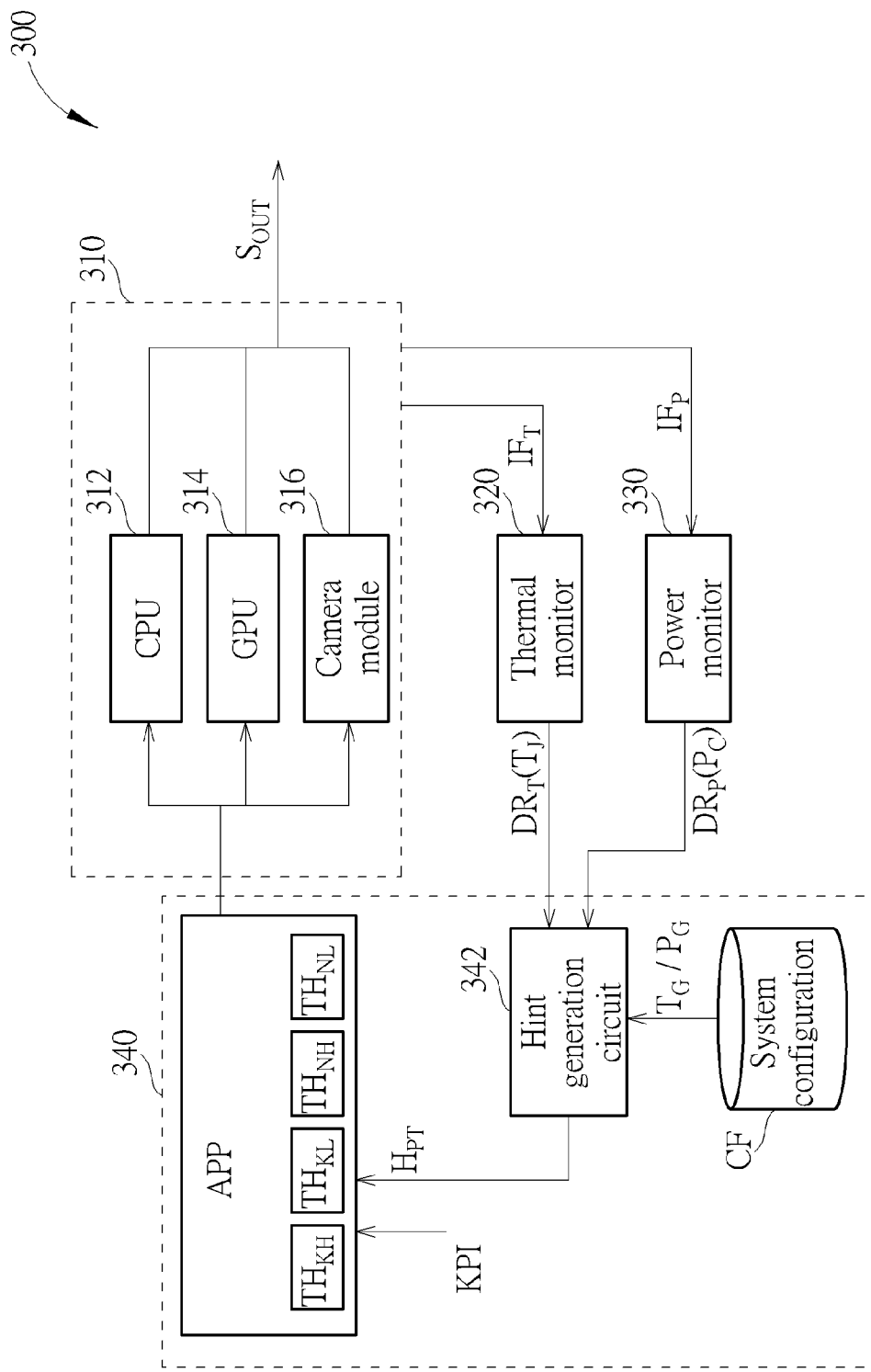
FIG. 3 is an implementation of the electronic device shown in FIG. 1.

Please refer to FIG. 3, which is an implementation of the electronic device 100 shown in FIG. 1. The electronic device 300 may include, but is not limited to, a processing circuit 310, a thermal monitor 320, a power monitor 330 and a controller 340, wherein the processing circuit 110, the thermal monitor 120, the power monitor 130 and the controller 140 shown in FIG. 1 may be implemented by the processing circuit 310, the thermal monitor 320, the power monitor 330 and the controller 340 respectively. The processing circuit 310 may include, but is not limited to, a central processing unit (CPU) 312, a graphics processing unit (GPU) 314 and a camera module 316. The thermal monitor 320 may detect the temperature $T_J$ of the electronic device 300 according to the thermal information $IF_T$ generated from at least one of the CPU 312, the GPU 314, the camera module 316 and other components of the electronic device 300 (e.g. a circuit board or a chassis). Hence, the thermal detection result $DR_T$ may indicate the detected temperature $T_J$, wherein the detected temperature $T_J$ may be, but is not limited to, a junction temperature of a die, a temperature of a circuit board, a temperature of a battery device or a temperature of a chassis of the electronic device 300. For example, the thermal monitor 320 may be an on-chip thermal sensor used for detecting a junction temperature of a die (e.g. a CPU/GPU/memory junction temperature) as the detected temperature $T_J$.

The power monitor 330 may detect the power $P_C$ of the electronic device 300 according to the power information IF generated from at least one of the CPU 312, the GPU 314, the camera module 316 and other components of the electronic device 300 (e.g. a battery unit). Hence, the power detection result $DR_P$ may indicate the detected power $P_C$, wherein the detected power $P_C$ may be a power consumed or supplied by the electronic device 300. For example, the power monitor 330 may detect a voltage/current of the electronic device 300 as the detected power $P_C$.

The controller 340 may include a hint generation circuit 342, a system configuration CF and the application APP running on the electronic device 300. The hint generation circuit 342 may generate the power-thermal hint $H_{PT}$ according to the thermal detection result $DR_T$, the power detection result $DR_P$ and the system configuration CF. For example, the hint generation circuit 342 may calculate a hint level of the power-thermal hint $H_{PT}$ according to the detected temperature $T_J$, the detected power $P_C$, a target temperature $T_G$ and a target power $P_G$ provided by the system configuration CF. Next, the controller 340 may adjust the complexity level of the application APP and/or the system capacity according to the power-thermal hint $H_{PT}$, wherein the system capacity may be a processor frequency and/or the number of activated processors of the processing circuit 310.

Figure 4:
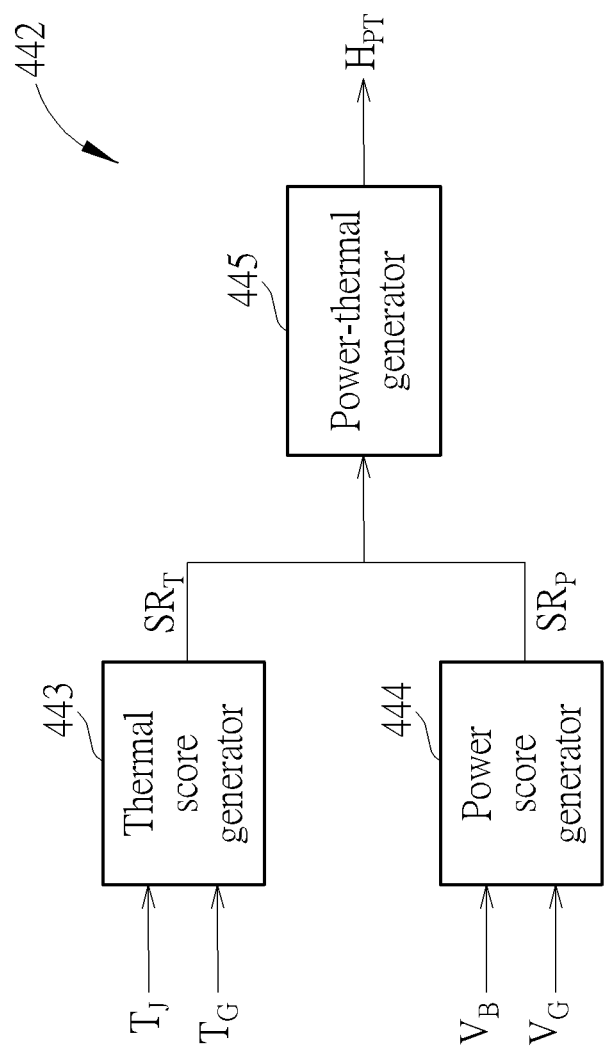
FIG. 4 is an implementation of the hint generation circuit shown in FIG. 3.

For a better understanding of the present invention, an exemplary calculation of the power-thermal hint is given in the following implementation where a battery voltage is detected and used as the detected power. However, this is for illustrative purposes only, and is not meant to be a limitation of the present invention. Please refer to FIG. 4 in conjunction with FIG. 3. FIG. 4 is an implementation of the hint generation circuit 342 shown in FIG. 3. In this implementation, a battery voltage $V_B$ of the electronic device 300 is detected by the power monitor 330, and is used as the detected power $P_C$ shown in FIG. 3. Hence, the hint generation circuit 442 may calculate the power-thermal hint $H_{PT}$ according to the detected temperature $T_J$ and the detected battery voltage $V_B$.

The hint generation circuit 442 may include a thermal score generator 443, a power score generator 444 and a power-thermal hint generator 445. The thermal score generator 443 may calculate a thermal score $SR_T$ according to a difference between a target temperature $T_G$ (provided by the system configuration CF) and the detected temperature $T_J$, and the power score generator 444 may calculate a power score $SR_P$ according to a difference between a target power $P_G$ (provided by the system configuration CF) and the detected power $P_C$. Next, the power-thermal hint generator 445 may generate the power-thermal hint $H_{PT}$ according to the thermal score $SR_T$ and the power score $SR_P$.

Figure 5:
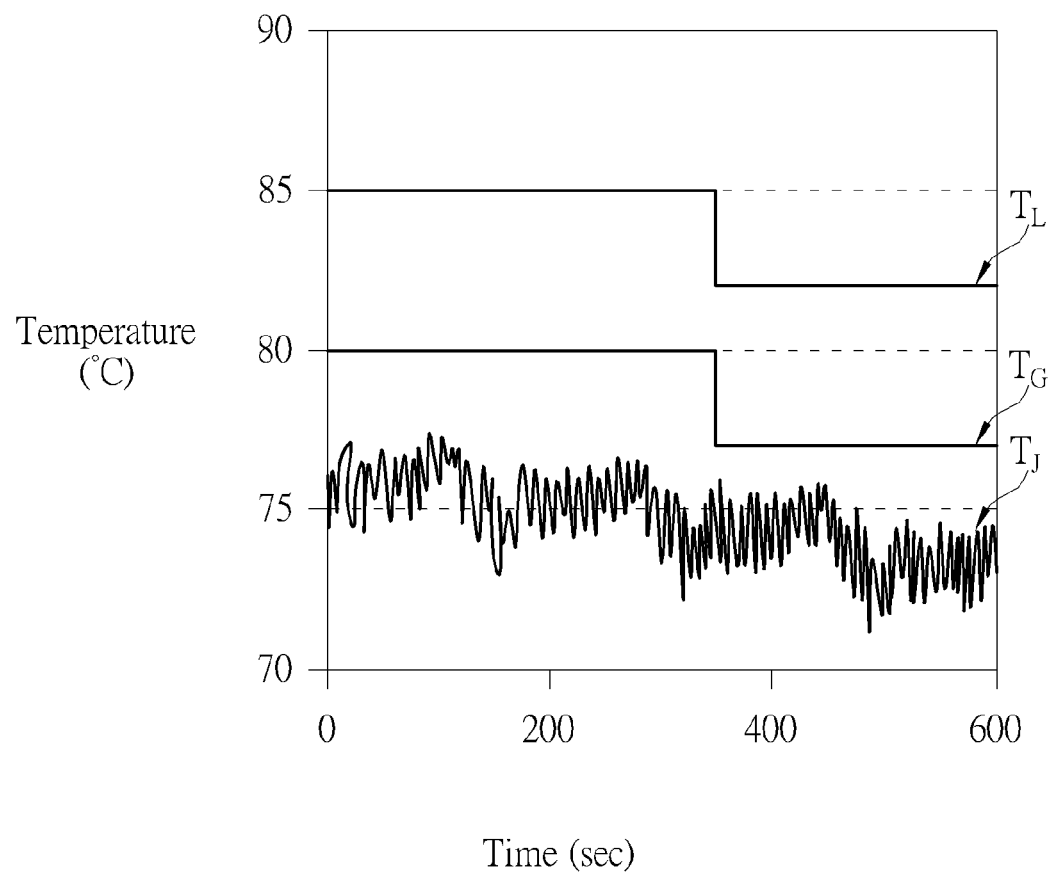
FIG. 5 illustrates an exemplary relationship between the target temperature and the detected temperature shown in FIG. 4 according to an embodiment of the present invention.

An exemplary calculation of the thermal score $SR_T$ is provided below. Please refer to FIG. 5 in conjunction with FIG. 4. FIG. 5 illustrates an exemplary relationship between the target temperature $T_G$ and the detected temperature $T_J$ shown in FIG. 4 according to an embodiment of the present invention. As shown in FIG. 5, the target temperature $T_G$ may be set to be less than a temperature threshold $T_L$, wherein thermal throttling mechanism is triggered when the detected temperature $T_J$ equals to or exceeds the temperature threshold $T_L$. Hence, the thermal score generator 443 may calculate the difference between the detected temperature $T_J$ and the target temperature $T_G$ so as to provide a warning indicator (the thermal score $SR_T$) to the power-thermal hint generator 445 in advance before the thermal throttling mechanism is triggered. For example, the thermal score generator 443 may calculate the thermal score $SR_T$ according to the following formula:

$$SR_T = (T_G - T_J) \times a\_t,$$

where the coefficient a_t is a thermal calculation coefficient, and may be determined according to actual design requirements. Hence, in one example where the coefficient a_t is 50, the thermal score $SR_T$ is 250 when the target temperature $T_G$ is 80° C. and the detected temperature $T_J$ is 75° C.

As can be seen from the above formula, the lower the detected temperature $T_J$ is, the higher the thermal score $SR_T$ is (i.e. overheating is more unlikely to happen); the higher the detected temperature $T_J$ is, the lower the thermal score $SR_T$ is (i.e. overheating is more likely to happen). In view of this, the thermal score generator 443 is able to provide the warning indicator (the thermal score $SR_T$) in advance before the thermal throttling mechanism is triggered.

In an alternative design, the thermal score generator 443 may calculate the thermal score $SR_T$ according to a rate of change of the detected temperature $T_J$ and the difference between the target temperature $T_G$ and the detected temperature $T_J$. For example, the thermal score generator 443 calculate the thermal score $SR_T$ according to the following formula:

$$SR_T = (T_G - T_J) \times a\_t + \Delta T \times b\_t,$$

where $\Delta T$ is the rate of change of the detected temperature $T_J$, and the coefficient b_t is a thermal calculation coefficient, which may be determined according to actual design requirements. As can be seen from the above formula, the higher the rate of change $\Delta T$ is (the detected temperature $T_J$ has a high rising speed), the lower the thermal score $SR_T$ is (i.e. overheating is more likely to happen).

Please note that, as shown in FIG. 5, when the electronic device 300 shown in FIG. 3 has warmed up sufficiently (e.g. at a point in time tA), the temperature threshold $T_L$ may be decreased to avoid an overshoot of a chassis temperature. The target temperature $T_G$ may be decreased accordingly so as to maintain the early warning function. Moreover, the difference between the temperature threshold $T_L$ and the target temperature $T_G$ may be determined according to an amount of temperature rise within a predetermined period of time. For example, the difference between the temperature threshold $T_L$ and the target temperature $T_G$ may be equal to a maximum amount of temperature rise in one frame.

Figure 6:
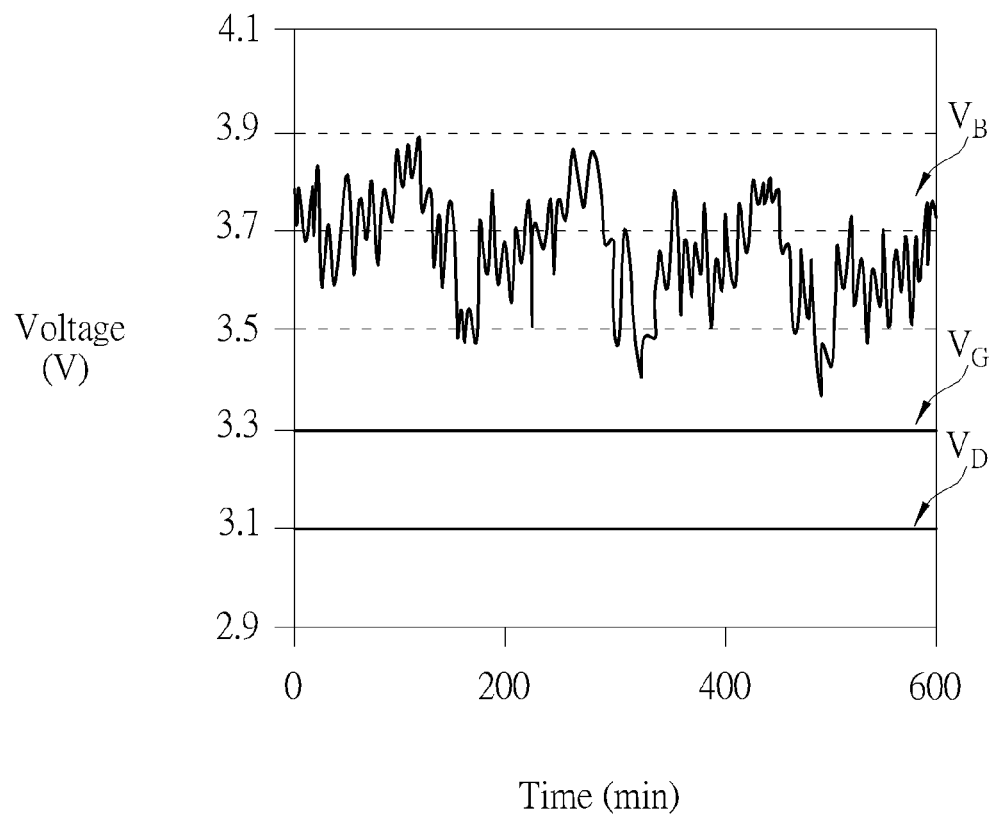
FIG. 6 illustrates an exemplary relationship between a target voltage and the detected battery voltage shown in FIG. 4 according to an embodiment of the present invention.

The following describes an exemplary calculation of the power score $SR_P$. Please refer to FIG. 6 in conjunction with FIG. 4. FIG. 6 illustrates an exemplary relationship between a target voltage $V_G$ and the detected battery voltage $V_B$ shown in FIG. 4 according to an embodiment of the present invention. As shown in FIG. 6, the target voltage $V_G$ may be set to be greater than a voltage threshold $V_D$, wherein the system (the electronic device 300 shown in FIG. 3) shut downs to ensure safety when the detected battery voltage $V_B$ equals to or falls below the voltage threshold $V_D$. In other words, the voltage threshold $V_D$ may be a minimum battery voltage required to power the electronic device 300. Hence, the power score generator 444 may calculate the difference between the detected battery voltage $V_B$ and the target voltage $V_G$ so as to provide a warning indicator (the power score $SR_P$) to the power-thermal hint generator 445 in advance before the electronic device 300 shuts down. For example, the power score generator 444 may calculate the power score $SR_P$ according to the following formula:

$$SR_P = (V_B - V_G) \times a\_p,$$

where the coefficient a_p is a power calculation coefficient, and may be determined according to actual design requirements. As can be seen from the above formula, the higher the detected battery voltage $V_B$ is, the higher the power score $SR_P$ is (i.e. system shutdown is more unlikely to happen); the lower the detected battery voltage $V_B$ is, the lower the power score $SR_P$ is (i.e. system shutdown is more likely to happen). In view of this, the power score generator 444 is able to provide the warning indicator (the power score $SR_P$) in advance before the battery voltage $V_B$ reaches the voltage threshold $V_D$.

In an alternative design, the power score generator 444 may calculate the power score $SR_P$ according to a rate of change of the detected battery voltage $V_B$ and the difference between the target voltage $V_G$ and the detected battery voltage $V_B$. For example, the power score generator 444 calculate the power score $SR_P$ according to the following formula:

$$SR_P = (V_B - V_G) \times a\_p + \Delta V \times b\_p,$$

where $\Delta V$ is the rate of change of the detected battery voltage $V_B$, and the coefficient b_t is a power calculation coefficient, which may be determined according to actual design requirements. As can be seen from the above formula, the lower the rate of change $\Delta V$ is (the detected battery voltage $V_B$ has a high falling speed), the lower the power score $SR_P$ is (i.e. system shutdown is more likely to happen).

Please note that the aforementioned score calculations are for illustrative purposes only, and are not meant to be a limitation of the present invention. For example, regarding calculation of the power score $SR_P$, a current (or a battery current) of the electronic device 300 shown in FIG. 3 may be detected and used as the detected power $P_C$ shown in FIG. 3. The power score generator 444 may calculate the power score $SR_P$ according to the detected current and a target current in a similar manner, thereby providing a warning indicator (the power score $SR_P$) in advance. In brief, as long as the power score generator 444 may calculate the power score $SR_P$ according to the difference between the target power $P_G$ and the detected power $P_C$ shown in FIG. 3, various modifications and alternatives fall within the scope of the prevent invention.

Please refer to FIG. 4 again. After the thermal score $SR_T$ and the power score $SR_P$ are calculated, the power-thermal hint generator 445 may generate the power-thermal hint $H_{PT}$ accordingly. By way of example but not limitation, the power-thermal hint generator 445 may firstly combine the thermal score $SR_T$ and the power score $SR_P$ to obtain a combined score $SR_H$ according to the following formula:

$$SR_H = \alpha \times SR_T + \beta \times SR_P,$$

where the coefficients $\alpha$ and $\beta$ are combination coefficients, which may be determined according to actual design requirements. In one example where the coefficient $\alpha$ is 0.6 and $\beta$ is 0.4, the combined score $SR_H$ is 540 when the thermal score $SR_T$ is 500 and the power score $SR_P$ is 600.

Next, the power-thermal hint 445 may convert the combined score $SR_H$ to the power-thermal hint $H_{PT}$. For example, with proper selection of the coefficients $\alpha$ and $\beta$, the power-thermal hint 445 may confine the combined score $SR_H$ to a predetermined score range such as between −200 and 1000. In addition, the hint level of the power-thermal hint $H_{PT}$ may be confined to a predetermined hint range such as between −2 and 9. The power-thermal hint generator 445 may map the combined score $SR_H$ to the power-thermal hint $H_{PT}$ according to the predetermined score range and the predetermined hint range. Specifically, in one example where the combined score $SR_H$ is 540, the hint level of the power-thermal hint $H_{PT}$ may be calculated as follows:

$$(540 - (-200))/(1000 - (-200)) \times (9 - (-2)) + (-2) = 4.$$

Based on the proposed hint level calculation, the correspondence between the detected temperature $T_J$ (or the detected power such as the detected battery voltage $V_B$) and the hint level of the power-thermal hint $H_{PT}$ may be obtained accordingly.

Please note that, in some embodiments, different applications may have different configuration settings (e.g. the target temperature/power). The correspondence between the detected temperature $T_J$ (or the detected battery voltage $V_B$) and the hint level of the power-thermal hint $H_{PT}$ may vary accordingly. For example, consider a case where an Android launcher runs on an electronic device and a 3D game application runs on another electronic device. As the Android launcher, may require less CPU loading than the 3D game application, the electronic device running the Android launcher may have a slower temperature rising speed than the electronic device running the 3D game application. In other words, when the two electronic devices are at the same temperature, the electronic device running the 3D game application is more likely to trigger thermal throttling.

Hence, to ensure that a timely warning is issued before thermal throttling is triggered, the proposed user experience control mechanism may provide suitable configuration settings for hint generation in response to a type of application. Please refer to FIG. in conjunction with FIG. 3. FIG. 7 illustrates exemplary correspondences between the detected temperature $T_J$ and the hint level of the power-thermal hint $H_{PT}$ shown in FIG. 3 under different scenarios according to an embodiment of the present invention. In this embodiment, when the application APP is initializing, the system configuration CF may provide configuration settings associated with the application APP (e.g. the target temperature $T_G$) to the hint generation circuit 342. By way of example but not limitation, when the application APP is the Android launcher (or a UI effect application), the target temperature $T_G$ provided by the system configuration CF is 80° C., and the detected temperature $T_J$ ranging from 84° C. to 74° C. corresponds to the power-thermal hint $H_{PT}$ having the hint level ranging from −2 to 3. When the application APP is the 3D game application, the target temperature $T_G$ provided by the system configuration CF is 75° C., and the detected temperature $T_J$ ranging from 85° C. to 60° C. corresponds to the power-thermal hint $H_{PT}$ having the hint level ranging from −2 to 3.

As shown in FIG. 7, the hint level is equal to or greater than 2 when the detected temperature $T_J$ corresponding to running the Android launcher is equal to or less than 76° C., while the hint level is equal to or greater than 2 when the detected temperature $T_J$ corresponding to running the 3D game application is equal to or less than 65° C. Hence, if it is assumed that the electronic device 300 is in a safe condition when the hint level is equal to or greater than 2, the detected temperature $T_J$ corresponding running the 3D game application has to fall below a lower temperature so as to ensure the safe condition. In view of this, as the power-thermal hint $H_{PT}$ may be calculated according to application characteristics (e.g. a temperature rising speed), the application APP (or a developer thereof) may know the current power/thermal condition according to the power-thermal hint $H_{PT}$ without querying the thermal monitor 320 and the power monitor 330. The power-thermal hint $H_{PT}$ may be used as an indicator for determining whether the electronic device 300 is in a safe power/thermal condition.

Further, different applications may require different hint level ranges. For example, a video codec application may require multiple video quality settings to meet various requirements, while a UI effect application, such as an Android launcher, may require a small number of effect settings. Specifically, in a case where the application APP is a video codec application, a predetermined hint range of the power-thermal hint $H_{PT}$ may range from −2 to 9, wherein the application APP may have, for example, at least 12 video quality settings (respectively corresponding to hint levels −2, −1, 0, . . . , 9). In a case where the application APP is an Android launcher, a predetermined hint range of the power-thermal hint $H_{PT}$ may range from −1 to 1, wherein the application APP may have 3 effect settings, which may correspond to "no effect", "weak effect" and "strong effect" respectively.

After receiving the power-thermal hint $H_{PT}$ from the hint generation circuit 342, the application APP may determine whether to adjust the complexity level and/or how to adjust the complexity level. By way of example but not limitation, in a case where the application APP is a video codec application, the application APP may set up a table, and adjust the complexity level according to the table. In one embodiment, at least a part of the table set up by the application APP is shown below.

| Hine level | Complexity level |
|---|---|
| −1 | 720p resolution; anti-aliasing (AA) is disabled |
| 0 | 1080p resolution; 2x AA is enabled |
| 1 | 2K resolution; 4x AA is enabled |

In some embodiments, the application APP (a video codec application) may adaptively adjust the complexity level without creating a mapping between a hint level and a video quality. For example, the application APP may adaptively adjust the complexity level according to the hint level of the power-thermal hint $H_{PT}$ in the following manner.

| Hine level | Adjustment operation |
|---|---|
| −1 | Decrease video quality one level |
| 0 | No operation (NOP) |
| 1 | Increase video quality one level |

Figure 8:
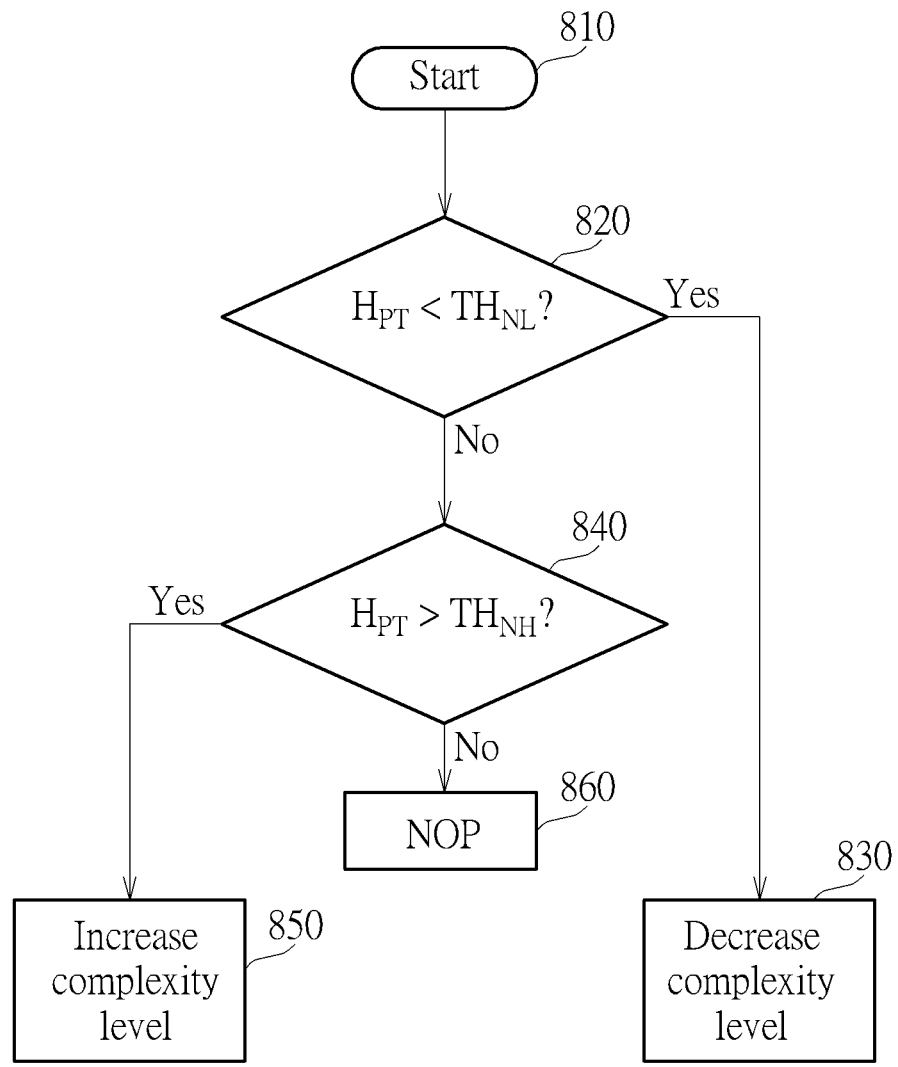
FIG. 8 is a flow chart of an exemplary method for adjusting the complexity level of the application shown in FIG. 3 according to an embodiment of the present invention.

In some other embodiments, the application APP (or the controller 340) may adaptively adjust the complexity level according to hint threshold(s). Please refer to FIG. 8, which is a flow chart of an exemplary method for adjusting the complexity level of the application APP shown in FIG. 3 according to an embodiment of the present invention. For illustrative purposes, the method shown in FIG. 8 is described with reference to the electronic device 300 shown in FIG. 3. This is not meant to be a limitation of the present invention. For example, the method shown in FIG. 8 may be employed in the electronic device 100 shown in FIG. 1. Additionally, provided that the result is substantially the same, the steps are not required to be executed in the exact order shown in FIG. 8. For example, other intermediate steps can be added. The method shown in FIG. 8 may be summarized below.

Step 810: Start. For example, the application APP may be initialized and receive the power-thermal hint $H_{PT}$ from the hint generation circuit 342.

Step 820: Determine whether the hint level of the power-thermal hint $H_{PT}$ is less than a hint threshold $TH_{NL}$. If yes, go to step 830; otherwise, proceed to step 840.

Step 830: Decrease the complexity level of the application APP. In one example where the application APP is a video codec application, the application APP may reduce a video quality, a video resolution, a video bitrate and/or a vide frame rate.

Step 840: Determine whether the hint level of the power-thermal hint $H_{PT}$ is greater than a hint threshold $TH_{NH}$. If yes, go to step 850; otherwise, proceed to step 860.

Step 850: Increase the complexity level of the application APP. In one example where the application APP is a video codec application, the application APP may enhance a video quality, a video resolution, a video bitrate and/or a vide frame rate.

Step 860: No adjustment operation is performed. Specifically, no adjustment of the complexity level is made.

Please note that the hint threshold $TH_{NL}$ and the hint threshold $TH_{NH}$ may be regarded as a low hint threshold and a high hint threshold of the application APP respectively. For example, consider a case where a correspondence between the detected temperature $T_J$ and the hint level of the power-thermal hint $H_{PT}$ in this embodiment is shown FIG. 7, and the hint threshold $TH_{NL}$ and the hint threshold $TH_{NH}$ equals to −1 and 1 respectively. When it is determined that the hint level of the power-thermal hint $H_{PT}$ is less than −1 (the hint threshold $TH_{NL}$ or the low hint threshold), the detected temperature $T_J$ may be so high that the system (the electronic device 300) is about to enter a thermal throttling mode. Hence, the application APP may decrease the complexity level to prevent triggering of thermal throttling (e.g. decreasing a video quality to keep playback smooth; step 830). When it is determined that the hint level of the power-thermal hint $H_{PT}$ is greater than 1 (the hint threshold $TH_{NH}$ or the high hint threshold), the system (the electronic device 300) may have a low temperature (e.g. the detected temperature $T_J$ is low), a high system power budget and/or a high system capacity. Hence, the application APP may increase the complexity level to take advantage of the sufficient computational power (step 850).

Although the power-thermal hint shown in FIG. 8 is used for complexity level adjustment, this is not meant to be a limitation of the present invention. For example, when it is determined that the hint level of the power-thermal hint $H_{PT}$ is less than the hint threshold $TH_{NL}$ (the low hint threshold), it is possible to increase the system capacity according to the power-thermal hint $H_{PT}$ so as to increase the computational power. In another example, when it is determined that the hint level of the power-thermal hint $H_{PT}$ is greater than the hint threshold $TH_{NH}$ (the high hint threshold), it is possible to decrease the system capacity according to the power-thermal hint $H_{PT}$ so as to reduce power consumption.

In view of the above, the application APP (or the controller 340) may know the current thermal/power condition according to the power-thermal hint $H_{PT}$ without directly querying the thermal monitor 320 and the power monitor 330. In other words, the proposed user experience control mechanism creates an abstraction layer for the application APP, wherein the application APP only needs to know the power-thermal hint $H_{PT}$ to adjust the complexity level thereof.

Figure 9:
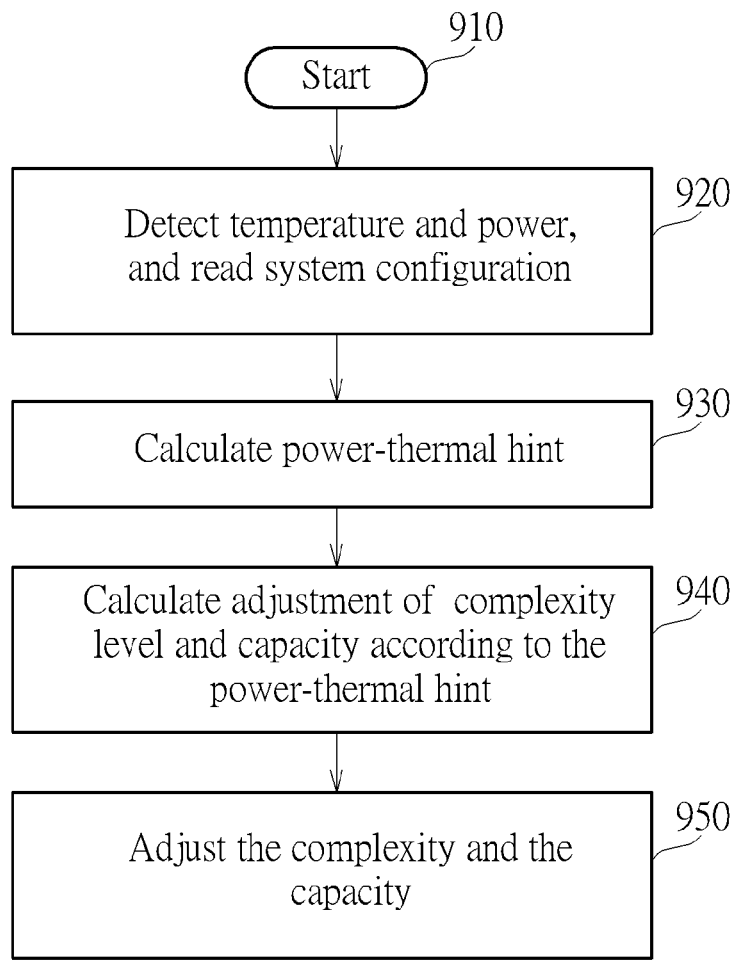
FIG. 9 is a flow chart of an exemplary method for controlling a user experience with an application on an electronic device.

The aforementioned user experience control mechanism may be summarized in FIG. 9. FIG. 9 is a flow chart of an exemplary method for controlling a user experience with an application on an electronic device. For illustrative purposes, the method shown in FIG. 9 is described with reference to the electronic device 300 shown in FIG. 3. This is not meant to be a limitation of the present invention. For example, the method shown in FIG. 8 may be employed in the electronic device 100 shown in FIG. 1. Additionally, provided that the result is substantially the same, the steps are not required to be executed in the exact order shown in FIG. 9. For example, other intermediate steps can be added. The method shown in FIG. 9 may be summarized below.

Step 910: Start.

Step 920: Detect a temperature, a power of the electronic device, and read a system configuration of the electronic device. For example, the controller 340 (or the hint generation circuit 342) may read the detected temperature $T_J$, the detected power $P_C$ and the system configuration CF.

Step 930: Calculate a power-thermal hint according to the detected temperature, the detected power and the system configuration. For example, the controller 340 (or the hint generation circuit 342) may calculate the power-thermal hint $H_{PT}$ according to the detected temperature $T_J$, the detected power $P_C$ and the system configuration CF.

Step 940: Calculate an adjustment of a complexity level of the application and an adjustment of a system capacity of the electronic device according to the power-thermal hint. For example, the controller 340 (or the application APP) may calculate an adjustment of the complexity level of the application APP and an adjustment of the system capacity of the electronic device 300.

Step 950: Adjust at least one of the complexity level of the application and the system capacity according to the calculated adjustments. For example, the controller 340 (or the application APP) may adjust the complexity level of the application APP according to the calculated adjustment, and the controller 340 (or the processing circuit 310) may adjust the system capacity of the electronic device 300 according to the calculated adjustment.

As a person skilled in the art should understand the operation of each step shown in the FIG. 9 after reading the above paragraph directed to FIGS. 1-8, further description is omitted here for brevity.

Please note that the proposed user experience control mechanism may further refer to a key performance index (KPI) to adjust the complexity level and/or the system capacity, wherein the key performance index may be indicative of a length of a frame buffer queue. Please refer to FIG. 3 again. As shown in FIG. 3, the controller 340 may further receive a key performance index (KPI). The application APP may adjust the complexity level of the application APP according to the power-thermal hint $H_{PT}$ and the KPI, wherein the KPI may be indicative of a queue length of a frame buffer of the electronic device 300 (not shown in FIG. 3). For example, as a long queue length means that frames are decoded at a fast speed, it is possible to decrease an affordable capacity and/or increase a request capacity of the electronic device 300 when the KPI is large.

Figure 10:
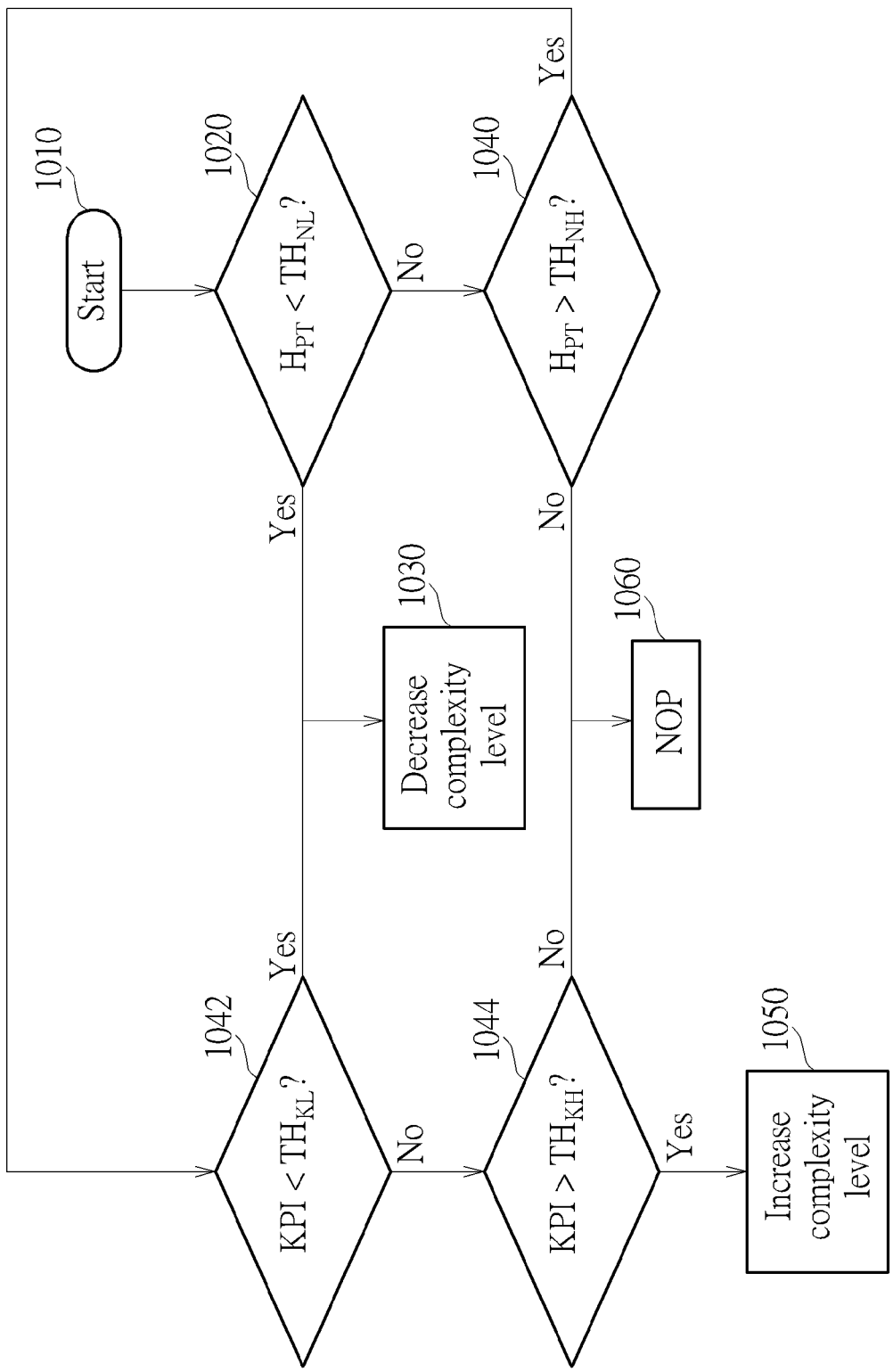
FIG. 10 illustrates a flow chart of an exemplary method for adjusting the complexity level of the application shown in FIG. 3 according to an embodiment of the present invention.

FIG. 10 illustrates a flow chart of an exemplary method for adjusting the complexity level of the application APP shown in FIG. 3 according to an embodiment of the present invention. The method shown in FIG. 10 is based on the method shown in FIG. 8, wherein the main difference is that the flow shown in FIG. 10 adjusts the complexity level of the application APP according to not only the power-thermal hint $H_{PT}$ but also the KPI. For illustrative purposes, the method shown in FIG. 10 is described with reference to the electronic device 300 shown in FIG. 3. This is not meant to be a limitation of the present invention. The method shown in FIG. 10 may be employed in the electronic device 100 shown in FIG. 1. Additionally, provided that the result is substantially the same, the steps are not required to be executed in the exact order shown in FIG. 10. The method shown in FIG. 10 may be summarized below.

Step 1010: Start. For example, the application APP may be initialized and receive the power-thermal hint $H_{PT}$ from the hint generation circuit 342.

Step 1020: Determine whether the hint level of the power-thermal hint $H_{PT}$ is less than the hint threshold $TH_{NL}$. If yes, go to step 1030; otherwise, proceed to step 1040.

Step 1030: Decrease the complexity level of the application APP.

Step 1040: Determine whether the hint level of the power-thermal hint $H_{PT}$ is greater than the hint threshold $TH_{NH}$. If yes, go to step 1042; otherwise, proceed to step 1060.

Step 1042: Determine whether the KPI is less than a performance threshold $TH_{KL}$. If yes, go to step 1030; otherwise, proceed to step 1044.

Step 1044: Determine whether the KPI is greater than a performance threshold $TH_{KH}$. If yes, go to step 1050; otherwise, proceed to step 1060.

Step 1050: Increase the complexity level of the application APP.

Step 1060: No adjustment operation is performed. Specifically, no adjustment of the complexity level is made.

In step 1042, the KPI may be less than the performance threshold $TH_{KL}$ when the frame buffer is running out. Hence, the application APP may decrease the complexity level (e.g. a video quality) to speed up the filling the frame buffer (step 1030). In step 1044, the KPI may be greater than the performance threshold $TH_{KH}$ when frames are decode at a sufficiently fast speed. Hence, the application APP may increase the complexity level (e.g. a video quality) to enhance a user's viewing experience (step 1050). Additionally, in this embodiment, the performance threshold $TH_{KL}$ and the performance threshold $TH_{KH}$ may be regarded as a low performance threshold and a high performance threshold of the application APP respectively.

Please note that the above is for illustrative purposes only, and is not meant to be a limitation of the present invention. In an alternative design, the performance threshold $TH_{KL}$ may be equal to the performance threshold $TH_{KH}$. In another alternative design, it is possible to modify the order of steps where decisions are made. For example, as long as the hint level of the power-thermal hint $H_{PT}$ is less than the hint threshold $TH_{NL}$ or the KPI is less than the performance threshold $TH_{KL}$, it is possible to decrease the complexity level of the application APP. In another example, as long as the hint level of the power-thermal hint $H_{PT}$ is greater than the hint threshold $TH_{NH}$ and the KPI is greater than the performance threshold $TH_{KH}$, it is possible to increase the complexity level of the application APP. As a person skilled in the art should understand the operation of each step shown in the FIG. 10 after reading the above paragraph directed to FIGS. 1-9, further description is omitted here for brevity.

Figure 11:
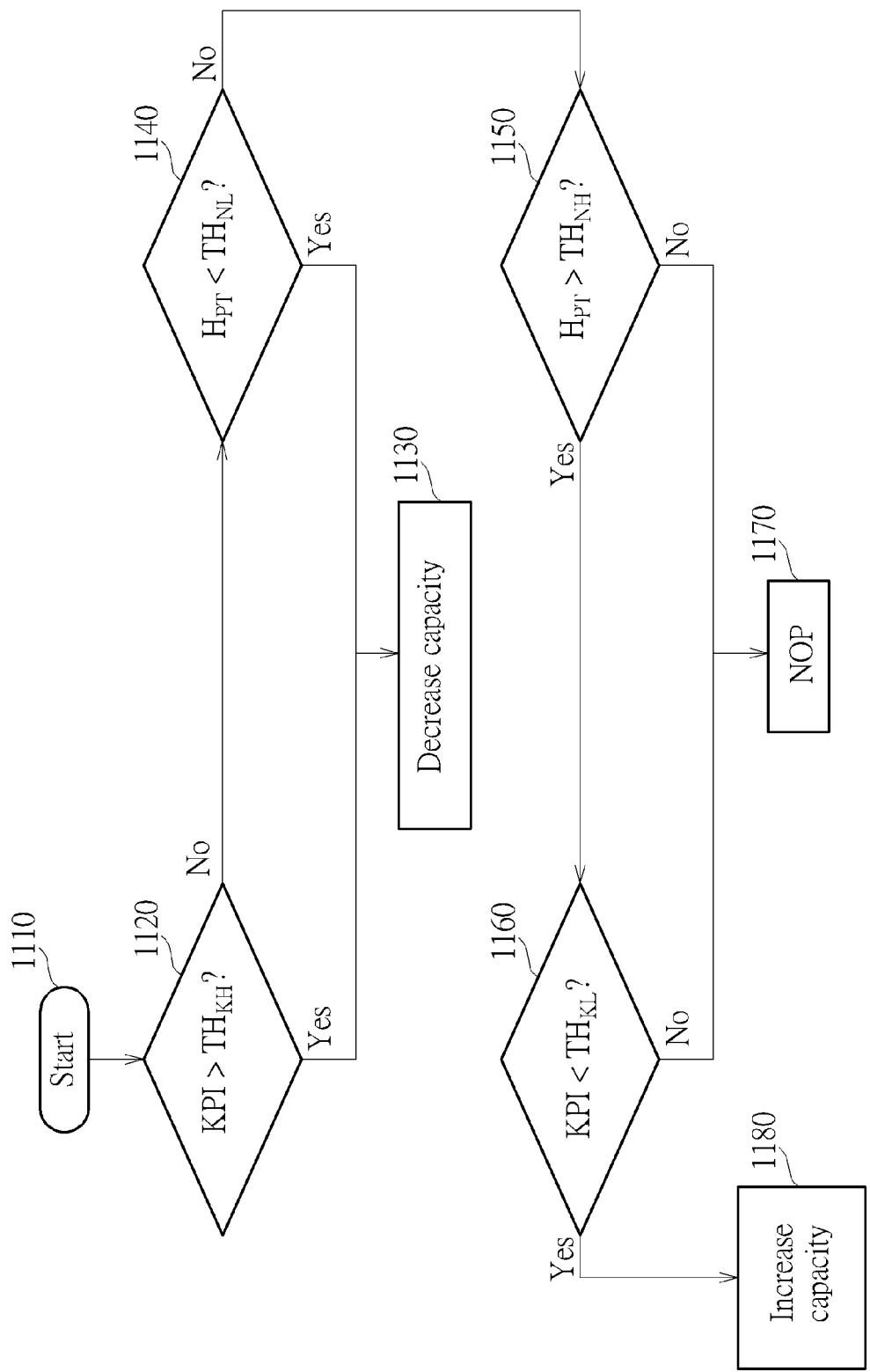
FIG. 11 illustrates a flow chart of an exemplary method for adjusting the system capacity of the application shown in FIG. 3 according to an embodiment of the present invention.

FIG. 11 illustrates a flow chart of an exemplary method for adjusting the system capacity of the application APP shown in FIG. 3 according to an embodiment of the present invention. The method shown in FIG. 11 is based on the method shown in FIG. 10, wherein the main difference is that the flow shown in FIG. 11 adjusts the system capacity according to the power-thermal hint $H_{PT}$ and the KPI. For illustrative purposes, the method shown in FIG. 11 is described with reference to the electronic device 300 shown in FIG. 3. This is not meant to be a limitation of the present invention. The method shown in FIG. 10 may be employed in the electronic device 100 shown in FIG. 1. Additionally, provided that the result is substantially the same, the steps are not required to be executed in the exact order shown in FIG. 11. The method shown in FIG. 11 may be summarized below.

Step 1110: Start. For example, the application APP may be initialized and receive the power-thermal hint $H_{PT}$ from the hint generation circuit 342.

Step 1120: Determine whether the KPI is greater than the performance threshold $TH_{KH}$. If yes, go to step 1130; otherwise, proceed to step 1140.

Step 1130: Decrease the system capacity of the electronic device 300.

Step 1140: Determine whether the hint level of the power-thermal hint $H_{PT}$ is less than the hint threshold $TH_{NL}$. If yes, go to step 1130; otherwise, proceed to step 1150.

Step 1150: Determine whether the hint level of the power-thermal hint $H_{PT}$ is greater than the hint threshold $TH_{NH}$. If yes, go to step 1170; otherwise, proceed to step 1160.

Step 1160: Determine whether the KPI is less than the performance threshold $TH_{KL}$. If yes, go to step 1180; otherwise, proceed to step 1170.

Step 1170: No adjustment operation is performed. Specifically, no adjustment of the system capacity is made.

Step 1180: Increase the system capacity of the electronic device 300.

Please note that the above is for illustrative purposes only, and is not meant to be a limitation of the present invention. In an alternative design, it is possible to modify the order of steps where decisions are made. For example, as long as the hint level of the power-thermal hint $H_{PT}$ is less than the hint threshold $TH_{NL}$ or the KPI is greater than the performance threshold $TH_{KH}$, the system capacity may be decreased. In another example, as long as the hint level of the power-thermal hint $H_{PT}$ is greater than the hint threshold $TH_{NH}$ and the KPI is less than the performance threshold $TH_{KL}$, the system capacity may be increased.

In another alternative design, the hint threshold $TH_{NL}$ shown in FIG. 11 may have a threshold level different from the hint threshold $TH_{NL}$ shown in FIG. 10, the hint threshold $TH_{NH}$ shown in FIG. 11 may have a threshold level different from the hint the hint threshold $TH_{NH}$ shown in FIG. 10, the performance threshold $TH_{KH}$ shown in FIG. 11 may have a threshold level different from the performance threshold $TH_{KH}$ shown in FIG. 10, and/or the performance threshold $TH_{KL}$ shown in FIG. 11 may have a threshold level different from the performance threshold $TH_{KL}$ shown in FIG. 10. As a person skilled in the art should understand the operation of each step shown in the FIG. 10 after reading the above paragraph directed to FIGS. 1-9, further description is omitted here for brevity.

In one embodiment, the proposed user experience control mechanism may adjust both of the complexity level and the system capacity in some thermal/power conditions according to the power thermal-hint and the key performance index. By way of example but not limitation, the user experience control strategy shown in FIG. 10 and FIG. 11 may be summarized in FIG. 12. For example, as shown in FIG. 12, when it is determined that the hint level of the power-thermal hint $H_{PT}$ is between the hint threshold $TH_{NL}$ (a low hint threshold) and the hint threshold $TH_{NH}$ (a high hint threshold) and the KPI is greater than the performance threshold $TH_{KH}$ (a high performance threshold), the system capacity may be decreased. As a person skilled in the art can readily understand the adjustment operations shown in FIG. 12 after reading the above paragraphs directed to FIG. 10 and FIG. 11, similar description is not repeated here for brevity.

Please note that, in the embodiment shown in FIG. 12, when the hint level of the power-thermal hint $H_{PT}$ is greater than the hint threshold $TH_{NH}$ (e.g. the high hint threshold), the priority of complexity adjustment and capacity adjustment may be determined according to design requirements. By way of example, in a case where power saving is considered more important than user experience enhancement, decreasing the system capacity takes precedence over increasing complexity level when the KPI is greater than the performance threshold $TH_{KH}$, and decreasing the complexity level takes precedence over increasing system capacity when the KPI is less than the performance threshold $TH_{KL}$. In another example where user experience enhancement is considered more important than power saving, increasing complexity level takes precedence over decreasing the system capacity when the KPI is greater than the performance threshold $TH_{KH}$, and increasing system capacity takes precedence over decreasing the complexity level when the KPI is less than the performance threshold $TH_{KL}$.

To sum up, the proposed user experience control mechanism may calculate a power-thermal hint, which is a single indicator (or an index) indicating power and thermal conditions of an electronic device, to create an easy-to-use abstraction layer for an application running on the electronic device, wherein the application may only need to know the power-thermal hint to adjust a complexity level thereof. Additionally, the proposed user experience control mechanism may provide a warning indicator to the application in advance before thermal throttling is triggered. The proposed user experience control mechanism may not only maintain an acceptable/good user experience but also reduce power consumption to prolong battery life.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for controlling a user experience with an application on an electronic device, comprising:
    detecting a temperature of the electronic device;
    detecting a power of the electronic device;
    calculating a power-thermal hint according to the detected temperature and the detected power; and
    adjusting a complexity level of the application according to at least the power-thermal hint so as to control the user experience with the application, comprising:
        adjusting the complexity level of the application according to the power-thermal hint and a key performance index, wherein the key performance index is indicative of a queue length of a frame buffer of the electronic device.

2. The method of claim 1, wherein a hint level of the power-thermal hint increases as the detected temperature decreases and the detected power increases, and the hint level of the power-thermal hint decreases as the detected temperature increases and the detected power decreases; and the step of adjusting the complexity level of the application according to at least the power-thermal hint comprises:
    when the hint level of the power-thermal hint is less than a first hint threshold, decreasing the complexity level of the application; and
    when the hint level of the power-thermal hint is greater than a second hint threshold, increasing the complexity level of the application.

3. The method of claim 2, wherein the hint level of the power-thermal hint is a first level when the detected temperature has a first rate of change, and the hint level of the power-thermal hint is a second level greater than the first level when the detected temperature has a second rate of change less than the first rate of change.

4. The method of claim 2, wherein the hint level of the power-thermal hint is a first level when the detected power has a first rate of change, and the hint level of the power-thermal hint is a second level greater than the first level when the detected power has a second rate of change greater than the first rate of change.

5. The method of claim 1, wherein the step of calculating the power-thermal hint according to the detected temperature and the detected power comprises:
    calculating a thermal score according to at least a difference between a target temperature and the detected temperature;
    calculating a power score according to at least a difference between a target power and the detected power; and
    generating the power-thermal hint according to the thermal score and the power score.

6. The method of claim 5, wherein the electronic device enters a thermal throttling mode when the detected temperature equals or exceeds a temperature threshold; and the target temperature is less than the temperature threshold.

7. The method of claim 5, wherein the target power is greater than a minimum power required to power the electronic device.

8. The method of claim 5, wherein the step of calculating the thermal score according to at least the difference between the target temperature and the detected temperature comprises:
    calculating the thermal score according to a rate of change of the detected temperature and the difference between the target temperature and the detected temperature.

9. The method of claim 5, wherein the step of calculating the power score according to at least the difference between the target power and the detected power comprises:
    calculating the power score according to a rate of change of the detected power and the difference between the target power and the detected power.

10. The method of claim 1, wherein a hint level of the power-thermal hint increases as the detected temperature decreases and the detected power increases, and the hint level of the power-thermal hint decreases as the detected temperature increases and the detected power decreases; and the step of adjusting the complexity level of the application according to the power-thermal hint and the key performance index comprises:
    when the hint level of the power-thermal hint is less than a first hint threshold or the key performance index is less than a first performance threshold, decreasing the complexity level of the application; and
    when the hint level of the power-thermal hint is greater than a second hint threshold and the key performance index is greater than a second performance threshold, increasing the complexity level of the application.

11. The method of claim 1, further comprising:
    adjusting a system capacity of the electronic device according to the power-thermal hint and the key performance index.

12. The method of claim 11, wherein the system capacity of the electronic device comprises at least one of a processor frequency and the number of activated processors.

13. The method of claim 11, wherein a hint level of the power-thermal hint increases as the detected temperature decreases and the detected power increases, and the hint level of the power-thermal hint decreases as the detected temperature increases and the detected power decreases; and the step of adjusting the system capacity of the electronic device according to the power-thermal hint and the key performance index comprises:
    when the hint level of the power-thermal hint is less than a first hint threshold or the key performance index is greater than a first performance threshold, decreasing the system capacity of the electronic device; and
    when the hint level of the power-thermal hint is greater than a second hint threshold and the key performance index is less than a second performance threshold, increasing the system capacity of the electronic device.

14. An electronic device, comprising:
a thermal monitor, for detecting a temperature of the electronic device;
a power monitor, for detecting a power of the electronic device; and
a controller, coupled to the thermal monitor and the power monitor, the controller arranged for calculating a power-thermal hint according to the detected temperature and the detected power, and adjusting a complexity level of the application according to the power-thermal hint and a key performance index so as to control a user experience with an application on the electronic device, wherein the key performance index is indicative of a queue length of a frame buffer of the electronic device.

15. The electronic device of claim 14, wherein a hint level of the power-thermal hint increases as the detected temperature decreases and the detected power increases, and the hint level of the power-thermal hint decreases as the detected temperature increases and the detected power decreases; when the hint level of the power-thermal hint is less than a first hint threshold, the controller decreases the complexity level of the application; and when the hint level of the power-thermal hint is greater than a second hint threshold, the controller increases the complexity level of the application.

16. The electronic device of claim 14, wherein a hint level of the power-thermal hint increases as the detected temperature decreases and the detected power increases, and the hint level of the power-thermal hint decreases as the detected temperature increases and the detected power decreases; when the hint level of the power-thermal hint is less than a first hint threshold or the key performance index is less than a first performance threshold, the controller decreases the complexity level of the application; and when the hint level of the power-thermal hint is greater than a second hint threshold and the key performance index is greater than a second performance threshold, the controller increases the complexity level of the application.

17. The electronic device of claim 14, wherein the controller further adjusts a system capacity of the electronic device according to the power-thermal hint and the key performance index.

18. The electronic device of claim 14, wherein a hint level of the power-thermal hint increases as the detected temperature decreases and the detected power increases, and the hint level of the power-thermal hint decreases as the detected temperature increases and the detected power decreases; when the hint level of the power-thermal hint is less than a first hint threshold or the key performance index is greater than a first performance threshold, the controller decreases the system capacity of the electronic device; and when the hint level of the power-thermal hint is greater than a second hint threshold and the key performance index is less than a second performance threshold, the controller increases the system capacity of the electronic device.

* * * * *